(12) United States Patent
Nishiyama

(10) Patent No.: US 9,176,323 B2
(45) Date of Patent: Nov. 3, 2015

(54) OPTICAL SCANNING DEVICE, IMAGE FORMING APPARATUS HAVING THE SAME, AND METHOD THEREFOR

(71) Applicant: BROTHER KOGYO KABUSHIKI KAISHA, Nagoya-shi, Aichi-ken (JP)

(72) Inventor: Katsuya Nishiyama, Kuwana (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/472,695

(22) Filed: Aug. 29, 2014

(65) Prior Publication Data

US 2015/0062281 A1     Mar. 5, 2015

(30) Foreign Application Priority Data

Sep. 2, 2013   (JP) ................................ 2013-181417

(51) Int. Cl.
*G02B 26/12*        (2006.01)
*B41J 2/47*         (2006.01)

(52) U.S. Cl.
CPC ............. *G02B 26/129* (2013.01); *B41J 2/473* (2013.01)

(58) Field of Classification Search
CPC .......... G02B 26/129; B41J 2/47; B41J 2/471; B41J 2/473
See application file for complete search history.

(56) References Cited

U.S. PATENT DOCUMENTS

| 5,883,657 A | 3/1999 | Minakuchi |
| 2006/0244810 A1 | 11/2006 | Takaki et al. |
| 2010/0245521 A1* | 9/2010 | Kubo ............................ 347/134 |

FOREIGN PATENT DOCUMENTS

| JP | 6-233074 A | 8/1994 |
| JP | 9-96771 A | 4/1997 |
| JP | 10-319335 A | 12/1998 |
| JP | 2006-305874 A | 11/2006 |

\* cited by examiner

*Primary Examiner* — Sarah Al Hashimi
(74) *Attorney, Agent, or Firm* — Merchant & Gould PC

(57) ABSTRACT

An optical scanning device including a controller configured to control a light emitter to emit a first light beam in accordance with a first pattern, control the light emitter to emit a second light beam in accordance with a second pattern, discriminate between a first signal output from a sensor in accordance with the first pattern and a second signal output from the sensor in accordance with the second pattern, identify a first moment at which the discriminated first signal has been output and a second moment at which the discriminated second signal has been output, and determine a moment to start forming on a scanned object a first scanning line by the first light beam, based on the identified first moment, and determine a moment to start forming on the scanned object a second scanning line by the second light beam, based on the identified second moment.

18 Claims, 10 Drawing Sheets

OPTICAL SCANNING DEVICE, IMAGE FORMING APPARATUS HAVING THE SAME, AND METHOD THEREFOR

CROSS-REFERENCE TO RELATED APPLICATION

This application claims priority under 35 U.S.C. §119 from Japanese Patent Application No. 2013-181417 filed on Sep. 2, 2013. The entire subject matter of the application is incorporated herein by reference.

BACKGROUND

1. Technical Field

The following description relates to one or more techniques for discriminating between (among) a plurality of light sources in an optical scanning device.

2. Related Art

A technique has been known that is adapted to discriminate between (among) a plurality of laser sources in an optical scanning device configured to perform optical scanning with the plurality of laser sources. Specifically, in the technique, with a plurality of comparator circuits provided on a side of a beam detection (BD) sensor, it is possible to identify a specific BD signal output from the BD sensor in response to detection of each individual one of the laser beams concurrently emitted by the laser sources.

SUMMARY

However, there might be a case where a sequence of the laser beams incident onto the BD sensor is reversed depending on environments and/or situations (e.g., temperature-dependent expansions of a polygon mirror and the laser sources, and vibrations of the polygon mirror and the laser sources caused by transportation of the device or earthquakes). Thus, it might lead to a misunderstanding of a correlation between the BD signals and the laser beams (i.e., mistakenly identifying which one of the laser sources, each of the BD signals has been output responsive to the laser beam emitted by).

Aspects of the present disclosure are advantageous to provide one or more improved techniques that make it possible to accurately grasp a correlation between BD signals and laser beams even in a situation where a sequence of the laser beams incident onto a BD sensor is reversed.

According to aspects of the present disclosure, an optical scanning device including a light emitter configured to emit a first light beam and a second light beam, a motor, a polygon mirror configured to, when driven to rotate by the motor, periodically deflect the first light beam and the second light beam emitted by the light emitter, and form, on an object to be scanned, a first scanning line by the first light beam and a second scanning line by the second light beam, a sensor configured to output a first signal in response to detection of the first light beam deflected by the polygon mirror, and output a second signal in response to detection of the second light beam deflected by the polygon mirror, and a controller configured to control the light emitter to emit the first light beam in accordance with a first pattern, the first pattern being such a waveform pattern as to repeat a cycle that includes a first time period during which the first signal output from the sensor has a voltage value of a first level, and a second time period during which the first signal output from the sensor has a voltage value of a second level lower than the first level, the cycle being shorter than a longest light-incident time period that is a longest time period during which the first light beam deflected by the polygon mirror is allowed to be continuously incident onto the sensor, control the light emitter to emit the second light beam in accordance with a second pattern that is different from the first pattern, the second pattern including a third time period during which the second signal output from the sensor has a voltage value of a third level higher than the second level, discriminate between the first signal output from the sensor in accordance with the first pattern and the second signal output from the sensor in accordance with the second pattern, identify a first moment at which the sensor has output the discriminated first signal according to the first pattern, and a second moment at which the sensor has output the discriminated second signal according to the second pattern, and determine a moment to start forming, on the object, the first scanning line by the first light beam, based on the identified first moment, and determine a moment to start forming, on the object, the second scanning line by the second light beam, based on the identified second moment.

According to aspects of the present disclosure, further provided is an image forming apparatus including a photoconductive body, and an optical scanning device including a light emitter configured to emit a first light beam and a second light beam, a motor, a polygon mirror configured to, when driven to rotate by the motor, periodically deflect the first light beam and the second light beam emitted by the light emitter, and form, on an object to be scanned, a first scanning line by the first light beam and a second scanning line by the second light beam, a sensor configured to output a first signal in response to detection of the first light beam deflected by the polygon mirror, and output a second signal in response to detection of the second light beam deflected by the polygon mirror, and a controller configured to control the light emitter to emit the first light beam in accordance with a first pattern, the first pattern being such a waveform pattern as to repeat a cycle that includes a first time period during which the first signal output from the sensor has a voltage value of a first level, and a second time period during which the first signal output from the sensor has a voltage value of a second level lower than the first level, the cycle being shorter than a longest light-incident time period that is a longest time period during which the first light beam deflected by the polygon mirror is allowed to be continuously incident onto the sensor, control the light emitter to emit the second light beam in accordance with a second pattern that is different from the first pattern, the second pattern including a third time period during which the second signal output from the sensor has a voltage value of a third level higher than the second level, discriminate between the first signal output from the sensor in accordance with the first pattern and the second signal output from the sensor in accordance with the second pattern, identify a first moment at which the sensor has output the discriminated first signal according to the first pattern, and a second moment at which the sensor has output the discriminated second signal according to the second pattern, and determine a moment to start forming, on the object, the first scanning line by the first light beam, based on the identified first moment, and determine a moment to start forming, on the object, the second scanning line by the second light beam, based on the identified second moment.

According to aspects of the present disclosure, further provided is a method adapted to be implemented on a control device coupled with an optical scanning device including a light emitter configured to emit a first light beam and a second light beam, a motor, a polygon mirror configured to, when driven to rotate by the motor, periodically deflect the first light beam and the second light beam emitted by the light emitter, and form, on an object to be scanned, a first scanning line by the first light beam and a second scanning line by the second light beam, a sensor configured to output a first signal in response to detection of the first light beam deflected by the polygon mirror, and output a second signal in response to detection of the second light beam deflected by the polygon mirror, the method including controlling the light emitter to emit the first light beam in accordance with a first pattern, the first pattern being such a waveform pattern as to repeat a cycle that includes a first time period during which the first signal output from the sensor has a voltage value of a first level, and a second time period during which the first signal output from the sensor has a voltage value of a second level lower than the first level, the cycle being shorter than a longest light-incident time period that is a longest time period during which the first light beam deflected by the polygon mirror is allowed to be continuously incident onto the sensor, controlling the light emitter to emit the second light beam in accordance with a second pattern that is different from the first pattern, the second pattern including a third time period during which the second signal output from the sensor has a voltage value of a third level higher than the second level, discriminating between the first signal output from the sensor in accordance with the first pattern and the second signal output from the sensor in accordance with the second pattern, identifying a first moment at which the sensor has output the discriminated first signal according to the first pattern, and a second moment at which the sensor has output the discriminated second signal according to the second pattern, and determining a moment to start forming, on the object, the first scanning line by the first light beam, based on the identified first moment, and determine a moment to start forming, on the object, the second scanning line by the second light beam, based on the identified second moment.

BRIEF DESCRIPTION OF THE ACCOMPANYING DRAWINGS

Figure 3:
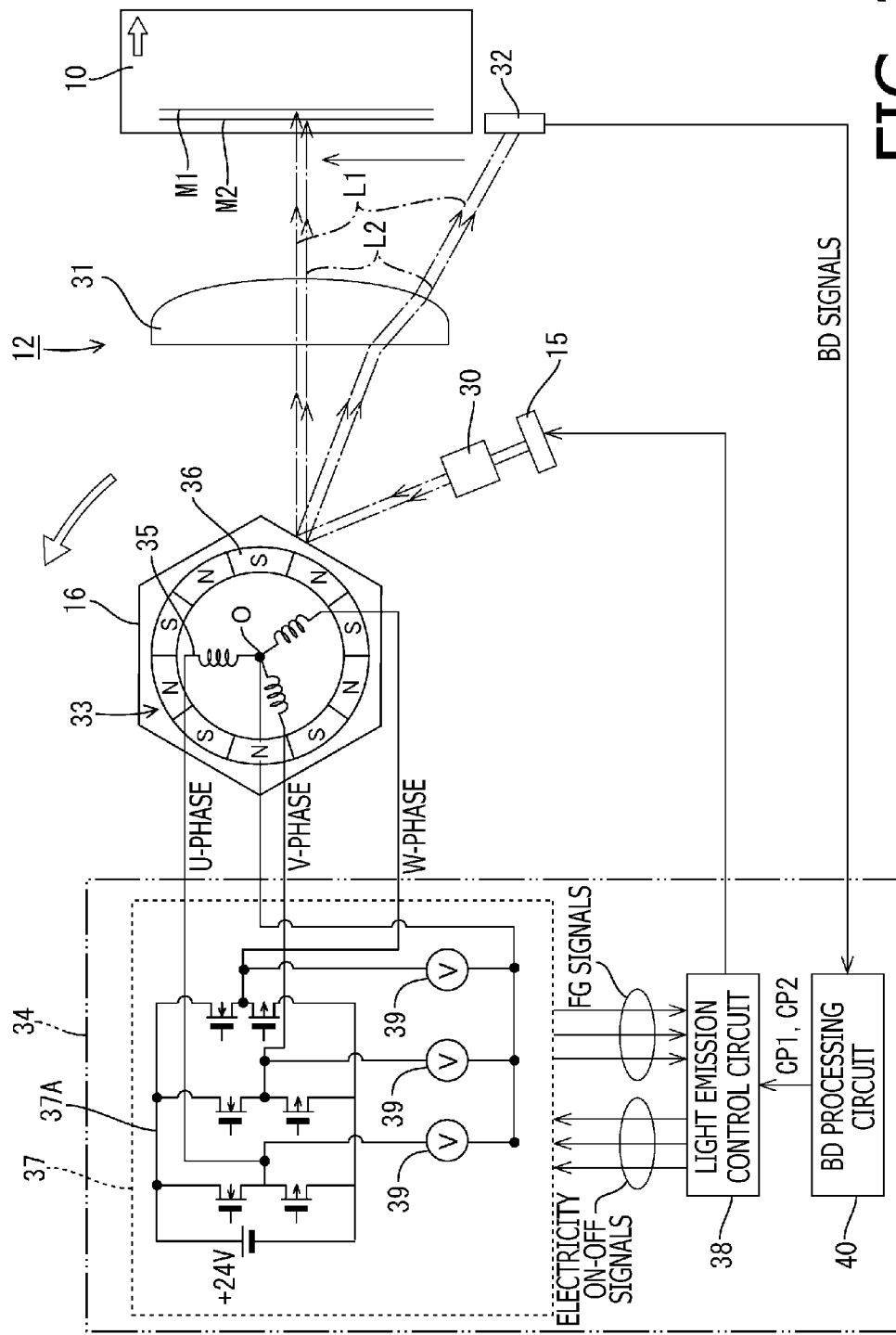

FIG. 3 schematically shows a configuration of a scanning section of the laser printer in the illustrative embodiment according to one or more aspects of the present disclosure.

Figure 4:
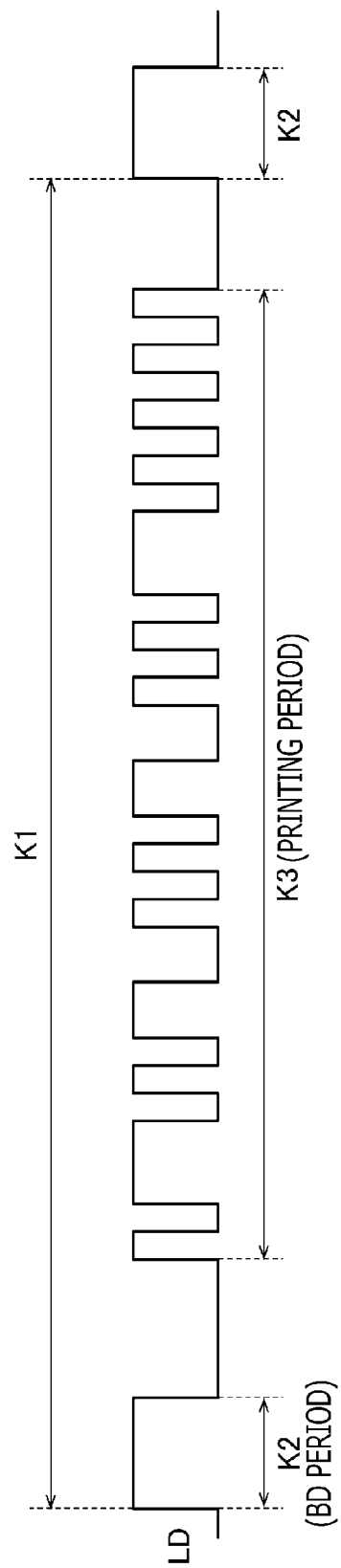

FIG. 4 is a time chart showing a waveform of a light emission signal for emitting each laser beam in the illustrative embodiment according to one or more aspects of the present disclosure.

Figure 5:
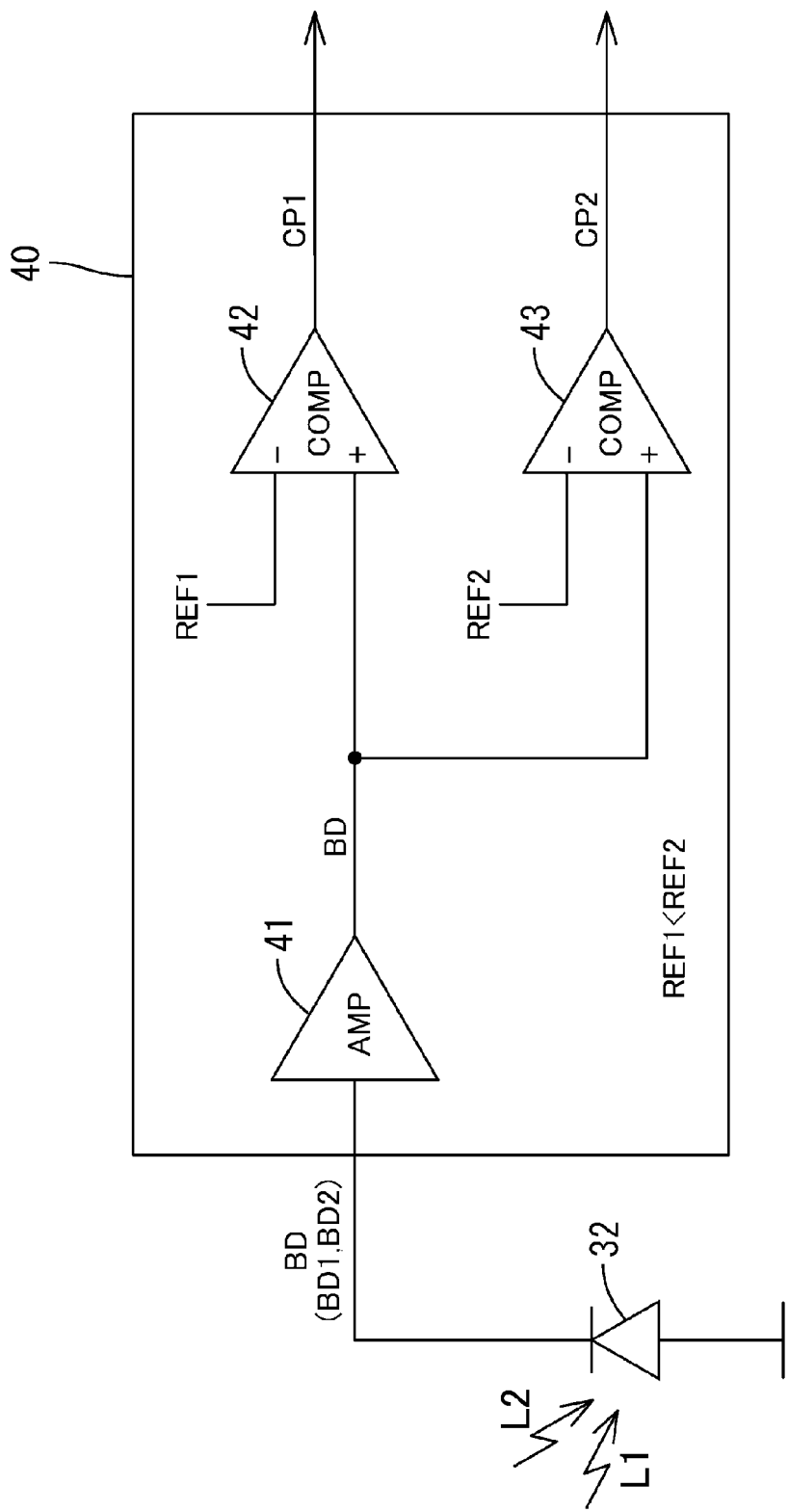

FIG. 5 is a block diagram schematically showing a configuration of a BD processing circuit in the illustrative embodiment according to one or more aspects of the present disclosure.

Figure 6:
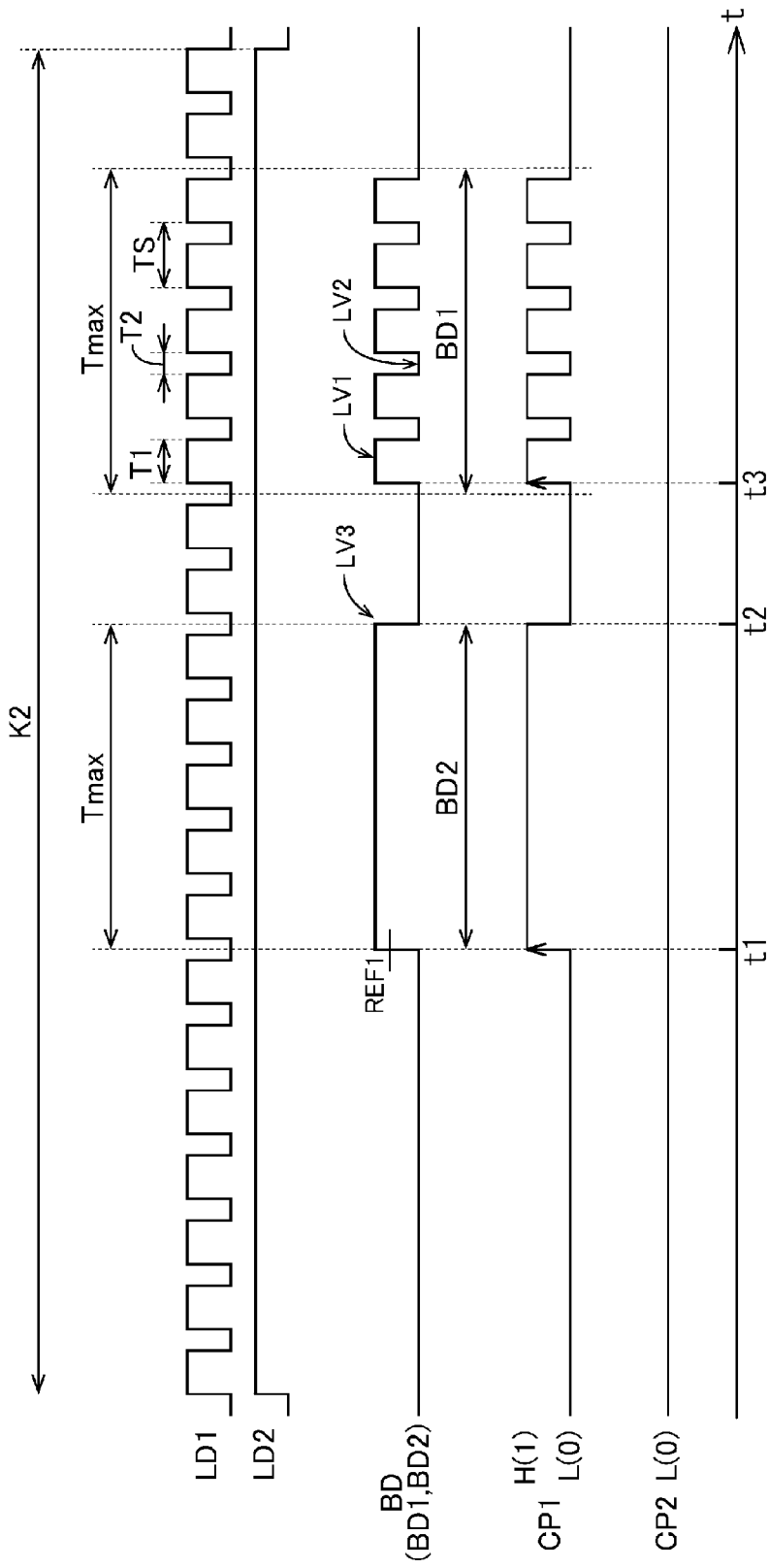

FIG. 6 shows time charts of light emission signals, BD signals, and comparison signals when an incident period of a second laser beam entirely precedes an incident period of a first laser beam, in the illustrative embodiment according to one or more aspects of the present disclosure.

Figure 7:
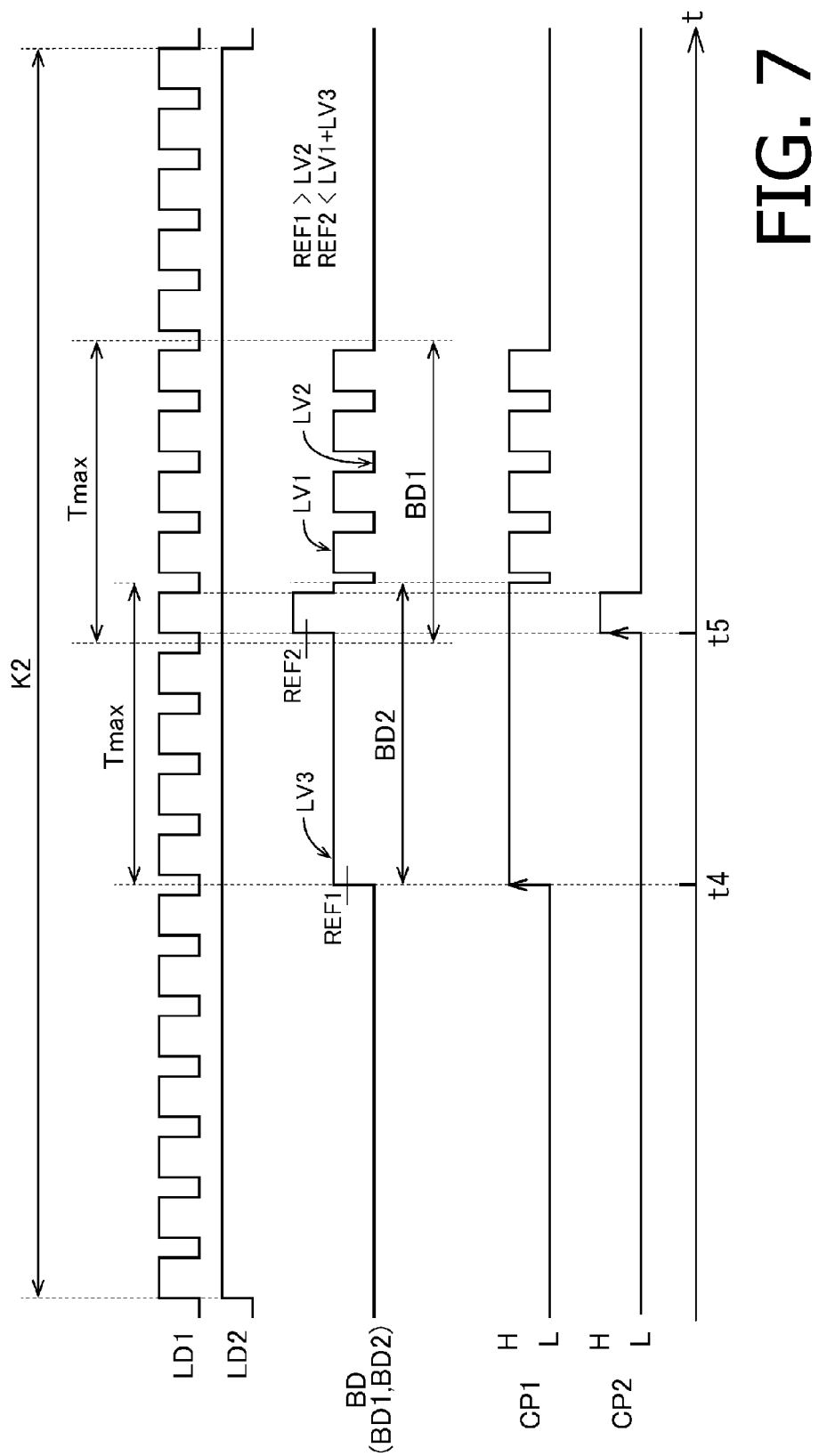

FIG. 7 shows time charts of the light emission signals, the BD signals, and the comparison signals when the incident period of the second laser beam precedes and partially overlaps the incident period of the first laser beam, in the illustrative embodiment according to one or more aspects of the present disclosure.

Figure 8:
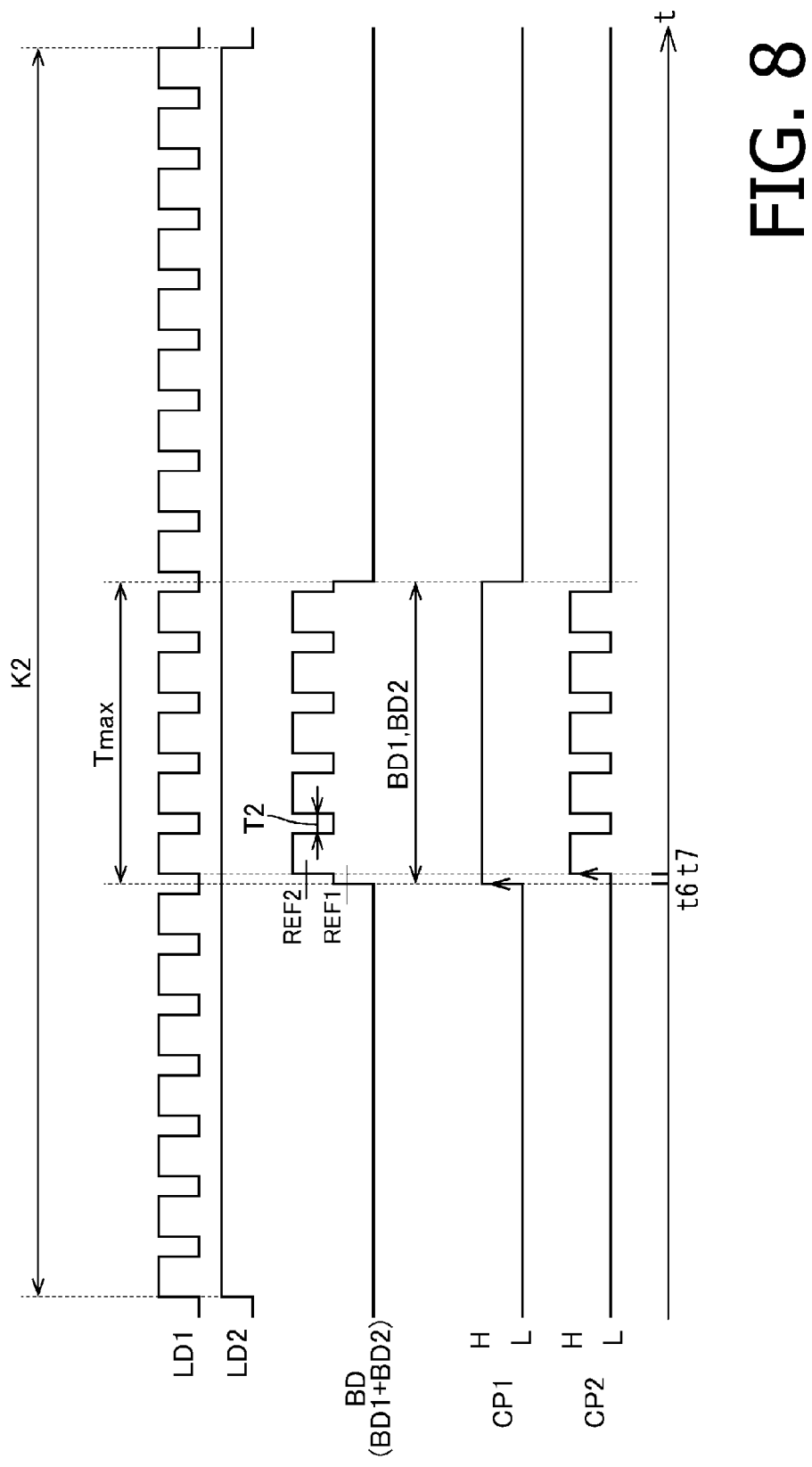

FIG. 8 shows time charts of the light emission signals, BD signals, and the comparison signals when the incident period of the first laser beam and the incident period of the second laser beam entirely overlap each other, in the illustrative embodiment according to one or more aspects of the present disclosure.

Figure 9:
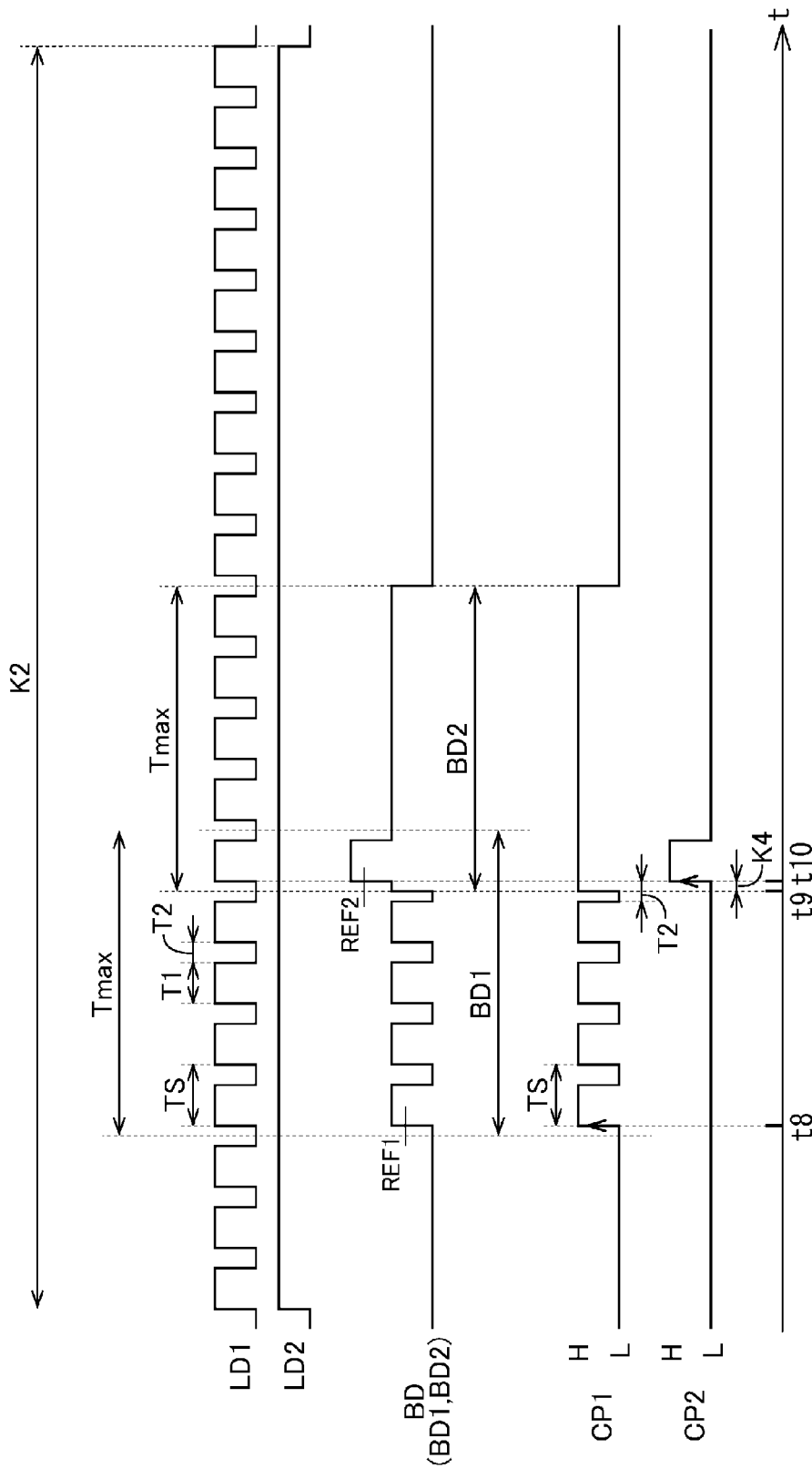

FIG. 9 shows time charts of the light emission signals, the BD signals, and the comparison signals when the incident period of the first laser beam precedes and partially overlaps the incident period of the second laser beam, in the illustrative embodiment according to one or more aspects of the present disclosure.

Figure 10:
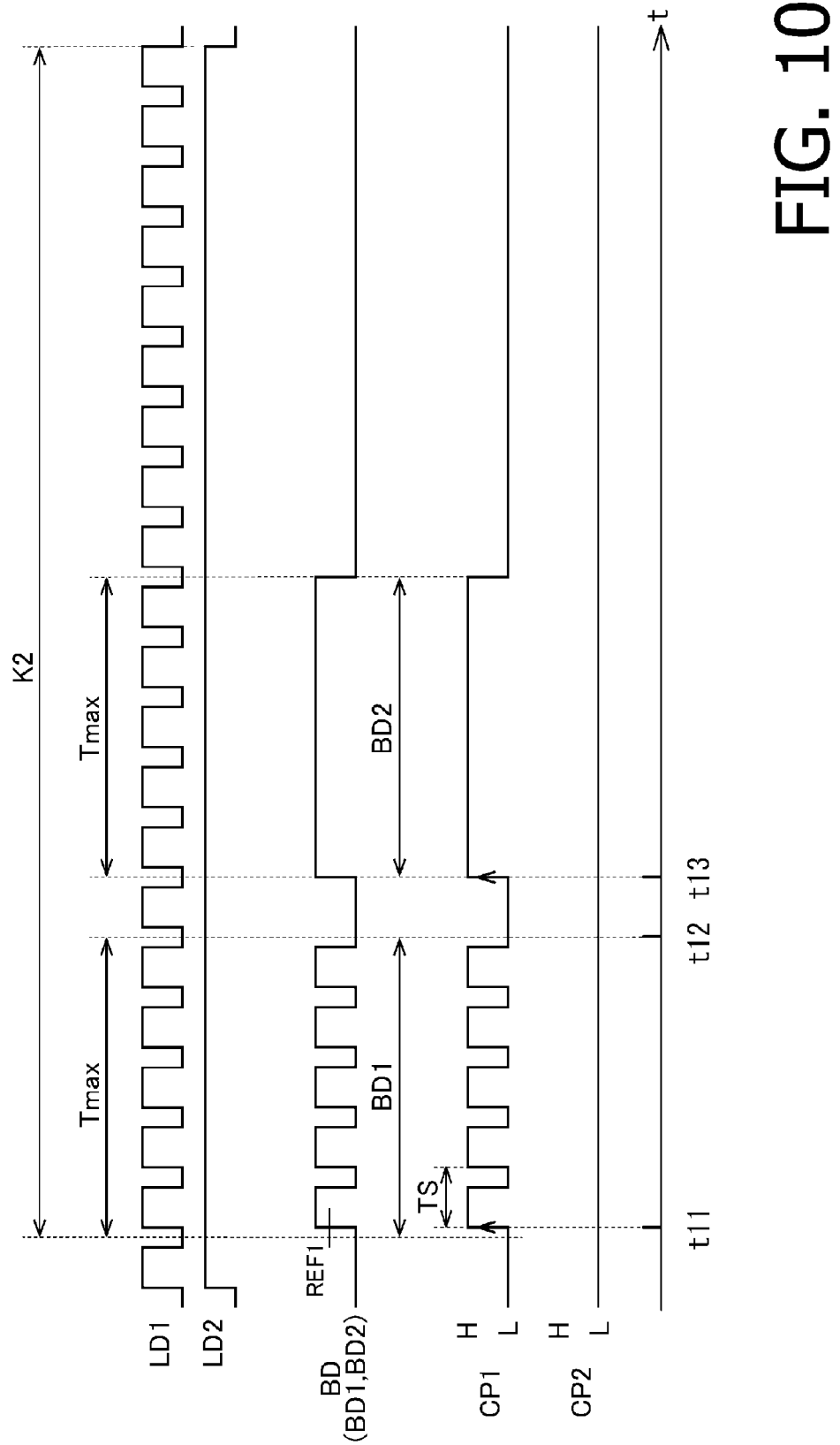

FIG. 10 shows time charts of the light emission signals, the BD signals, and the comparison signals when the incident period of the first laser beam entirely precedes the incident period of the second laser beam, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

ILLUSTRATIVE EMBODIMENT

Hereinafter, an illustrative embodiment according to aspects of the present disclosure will be described with reference to the accompanying drawings.

1. Configuration of Laser Printer

Figure 1:
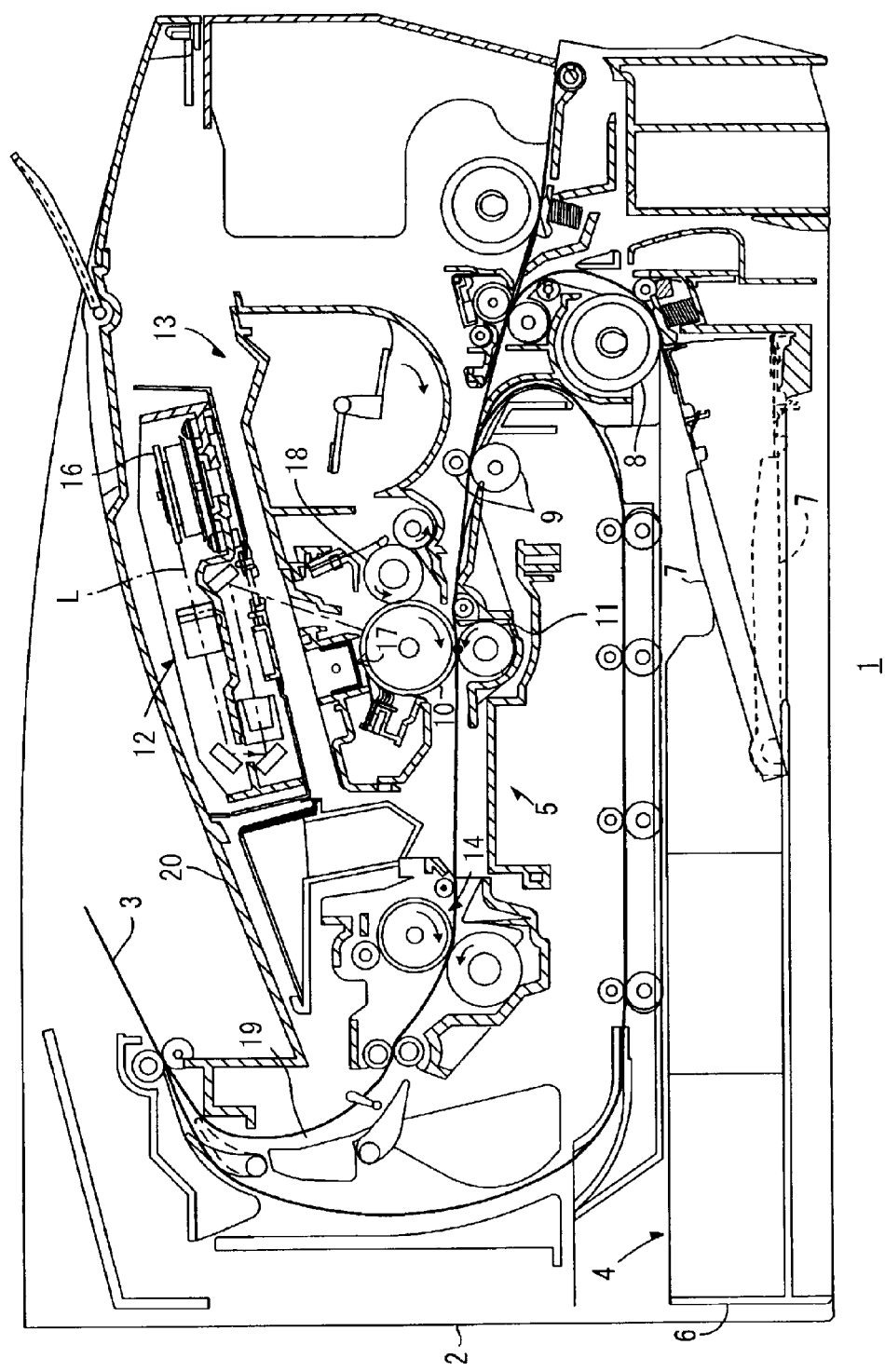
FIG. 1 is a cross-sectional side view showing a major portion of a laser printer in an illustrative embodiment according to one or more aspects of the present disclosure.

FIG. 1 is a cross-sectional side view showing a major portion of a laser printer 1. It is noted that the following description will be provided under an assumption that a right side of FIG. 1 corresponds to a front side of the laser printer 1. To the laser printer 1, a so-called multi-beam technology is applied that is adapted to concurrently form two scanning lines on a photoconductive body by two laser beams. It is noted that the laser printer 1 may be a monochrome printer (a single color printer) or a color printer capable of printing with two or more colors. Further, the laser printer 1, as long as it has a printing function, may be a multi-function peripheral having multiple functions such as a facsimile function, a copy function, and a scanning function.

The laser printer 1 includes a feeder unit 4 and an image forming unit 5. The feeder unit 4 is configured to feed one or more sheets into a main body frame 2. The image forming unit 5 is configured to form an image on a sheet fed by the feeder unit 4.

The feeder unit 4 includes a tray 6, a pressing plate 7, a pickup roller 8, and two registration rollers 9. The pressing plate 7 is configured to rotate around a rear end portion of the pressing plate 7, and configured such that a top one of sheets 3 on the pressing plate 7 is pressed toward the pickup roller 8. The sheets 3 are picked up by rotation of the pickup roller 8 on a sheet-by-sheet basis.

The picked-up sheets 3 are conveyed to a transfer position, after skew correction by the registration rollers 9. The transfer position is a position where a toner image on a photoconductive body 10 is transferred onto a sheet 3. In other words, the transfer position is a position where the photoconductive body 10 contacts a transfer roller 11.

The image forming unit 5 includes a scanning section 12, a process cartridge 13, and a fuser section 14. The scanning section 12 will be described below in detail.

Further, the process cartridge 13 includes the photoconductive body 10, a scorotron charger 17, and a development roller 18. It is noted that the photoconductive body 10 is not limited to a drum-type one, but may be a belt-type one. The charger 17 is configured to evenly and positively charge a surface of the photoconductive body 10. The charged surface of the photoconductive body 10 is exposed to laser beams L1 and L2 from the scanning section 12, and an electrostatic latent image is formed on the surface of the photoconductive body 10. Subsequently, toner carried on a surface of the development roller 18 is supplied to the electrostatic latent image formed on the photoconductive body 10. Thereby, the electrostatic latent image is developed, and a toner image is formed on the photoconductive body 10.

The toner image formed on the sheet 3 is thermally fixed by the fuser section 14. Thereafter, the sheet 3 with the toner image fixed thereon is ejected onto a catch tray 20 through a sheet ejection path 19.

2. Electrical Configuration of Laser Printer

Figure 2:
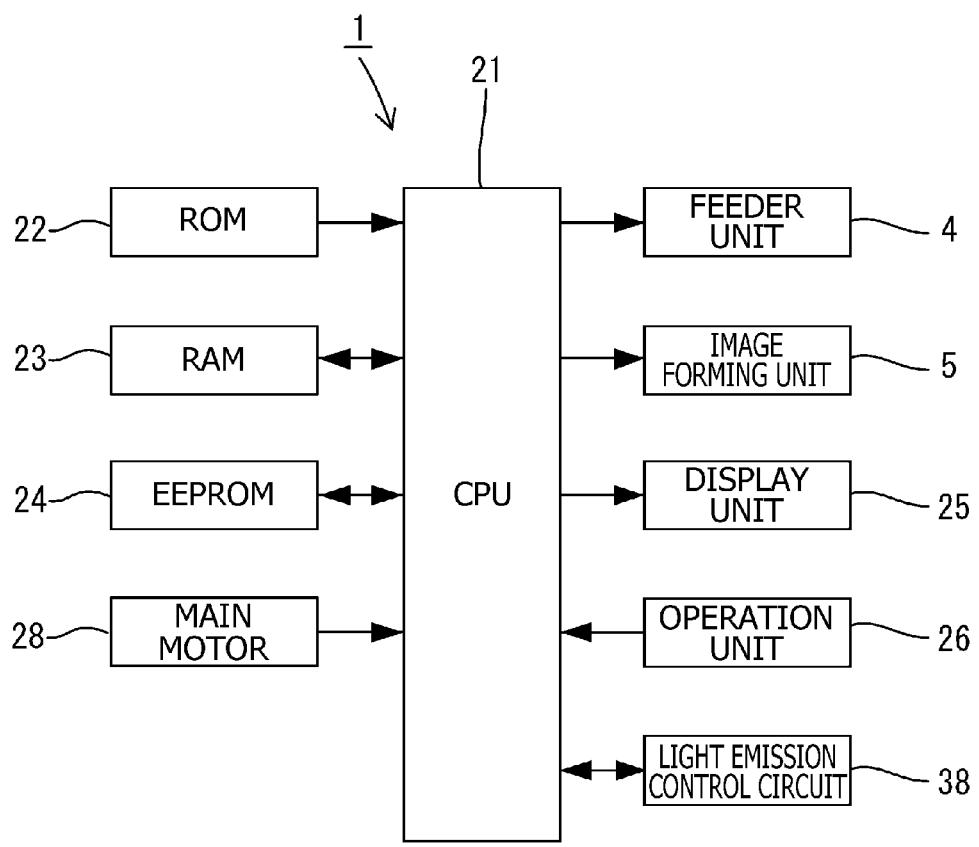
FIG. 2 is a block diagram showing an electrical configuration of the laser printer in the illustrative embodiment according to one or more aspects of the present disclosure.

Next, referring to FIG. 2, an electrical configuration of the laser printer 1 will be described. The laser printer 1 includes a CPU 21, a ROM 22, a RAM 23, an EEPROM 24, the feeder unit 4, the image forming unit 5, a display unit 25 (which includes various lamps and a liquid crystal panel), an operation unit 26 (which includes an input panel), a main motor 28, and a light emission control circuit 38. Besides the above elements, the laser printer 1 includes a network interface (not shown) configured to connect the laser printer 1 with an external device. The EEPROM 24 stores a control program configured to, when executed by the CPU 21, cause the CPU 21 to perform print preprocessing as will be described below.

The main motor 28 is configured to drive and rotate various feed rollers 8 and 9 of the feeder unit 4, the photoconductive body 10, and the transfer roller 11. The main motor 28 is driven to rotate independently of a below-mentioned brushless motor 33 of the scanning section 12.

3. Configuration of Scanning Section

Subsequently, referring to FIG. 3, a configuration of the scanning section 12 will be described. The scanning section 12 includes a twin-beam laser emitter 15, a first lens portion 30, a polygon mirror 16, a second lens portion 31, a light receiving sensor (BD sensor) 32, a brushless motor 33, and a control board 34.

The twin-beam laser emitter 15 has two laser sources. The twin-beam laser emitter 15 is configured to emit a first laser beam L1 and a second laser beam L2 from respective positions that are away from each other. The first laser beam L1 and the second laser beam L2 emitted by the twin-beam laser emitter 15 are periodically deflected by the polygon mirror 16 to be incident onto the photoconductive body 10. It is noted that a semiconductor laser (a laser diode) may be cited as an example of the laser sources. Further, the twin-beam laser emitter 15 may be formed with two laser sources integrated as a single chip or with two separate laser sources.

The first lens portion 30 includes a collimator lens and a cylindrical lens. The first lens portion 30 is configured to cause the laser beams L1 and L2 emitted by the twin-beam laser emitter 15 to be transmitted therethrough and incident onto the polygon mirror 16. The second lens portion 31 includes an fθ lens and a cylindrical lens. The second lens portion 31 is configured to cause the laser beams L1 and L2 deflected by the polygon mirror 16 to be transmitted therethrough and incident onto the photoconductive body 10.

The polygon mirror 16 has six mirror surfaces. The polygon mirror 16 is driven to rotate at a high speed by the brushless motor 33. It is noted that the number of the mirror surfaces is not limited to six, but may be, e.g., four or eight. The first laser beam L1 and the second laser beam L2 emitted by the twin-beam laser emitter 15 are reflected in respective positions, which are away from each other in a rotational axis direction of the polygon mirror 16, on each mirror surface of the polygon mirror 16. Therefore, the polygon mirror 16 is configured to, when rotated at a high speed, periodically deflect the laser beams L1 and L2 emitted by the twin-beam laser emitter 15, and introduce the laser beams L1 and L2 onto the photoconductive body 10 via the second lens portion 31 to concurrently form two scanning lines M1 and M2 (see FIG. 3). It is noted that the scanning lines M1 and M2 are formed by the laser beams L1 and L2, respectively. Each of the scanning lines M1 and M2 is a dotted exposure line formed based on corresponding line data of image data. When a single piece of line data corresponds to a blank portion of an image, any scanning line is not formed based on the single piece of line data.

Namely, as shown in FIG. 4, a light emission signal LD for emitting each laser beam L1 and L2 is a periodic signal having a cycle K1 for deflection of each laser beam L1 and L2. The cycle K1 contains a beam detection (BD) period K2 and a printing period K3. The BD period K2 is a time period for determining a moment (timing) to start writing each scanning line M1 and M2 by each laser beam L1 and L2. The printing period K3 is a time period for forming each scanning line M1 and M2 on the photoconductive body 10.

The brushless motor 33 may be, e.g., a three-phase brushless DC motor. The brushless motor 33 includes a stator 35 and a rotor 36. The stator 35 includes three coils disposed thereat, i.e., a coil for a U-phase, a coil for a V-phase, and a coil for a W-phase. The rotor 36 includes ten permanent magnets disposed thereat as ten poles for magnetic field. In this respect, however, the number of the permanent magnets may not necessarily be ten. Further, in the brushless motor 33, the three coils are connected by a star connection. The polygon mirror 16 rotates integrally with the rotor 36.

The control board 34 includes a drive circuit 37, the light emission control circuit 38, and a BD processing circuit 40 mounted thereon. The drive circuit 37 is configured to drive and rotate the brushless motor 33. More specifically, the drive circuit 37 includes an inverter 37A and voltage detection circuits 39, and is configured to switch an electricity-supplied state of each coil between an ON-state where the corresponding coil is supplied with electricity and an OFF-state where the corresponding coil is not supplied with electricity. The light emission control circuit 38 includes an application specific integrated circuit (ASIC) containing a timer and a memory. The light emission control circuit 38 is configured to take control of laser emission of the twin-beam laser emitter 15 and rotation of the brushless motor 33 (the polygon mirror 16) in accordance with instructions from the CPU 21. In the control of rotation of the brushless motor 33, the light emission control circuit 38 receives FG signals each of which changes its level depending on a change in a polarity of a magnet approaching a corresponding coil, and supplies to the drive circuit 37 an electricity on-off signal responsive to each FG signal. Further, the light emission control circuit 38 performs a below-mentioned sensor signal identifying process. It is noted that the light emission control circuit 38 may include a CPU different from the CPU 21, a timer, and a memory, instead of the ASIC.

The light receiving sensor 32 includes a photodiode. The light receiving sensor 32 is disposed in such a position as to receive the laser beams L1 and L2 before the laser beams L1 and L2 deflected by the polygon mirror 16 reach the photoconductive body 10. The light receiving sensor 32 is for determining timing to start writing each of the scanning lines M1 and M2 by the laser beams L1 and L2, respectively. The light receiving sensor 32 is configured to receive the laser beams L1 and L2 emitted by the twin-beam laser emitter 15, and output BD signals as detection signals toward the light emission control circuit 38. Specifically, in the illustrative embodiment, the light receiving sensor 32 is configured to transmit the BD signals to the light emission control circuit 38 via the BD processing circuit 40.

The light receiving sensor 32 transmits, to the BD processing circuit 40, a first BD signal BD1 corresponding to the first laser beam L1 and a second BD signal BD2 corresponding to the second laser beam L2. Namely, the BD signals include the first BD signal BD1 and the second BD signal BD2. When the first laser beam L1 and the second laser beam L2 are concurrently received, the first BD signal BD1 and the second BD signal BD2 are transmitted in a superimposed manner. It is noted that the light receiving sensor 32 may be disposed in such a position as to receive the laser beams L1 and L2 after the laser beams L1 and L2 pass over the photoconductive body 10.

As shown in FIG. 6, a first light emission signal LD1 for emitting the first laser beam L1 has a first pattern that is such a waveform pattern of a pulse signal that a first time period T1 and a second time period T2 are alternately repeated in a cycle TS during a longest light-incident time period Tmax in the BD period K2. During the first time period T1, the first BD signal BD1 has a voltage value of a first level LV1. During the second time period T2, the first BD signal BD1 has a voltage value of a second level LV2. It is noted that the longest light-incident time period Tmax is a longest time period during which each of the laser beams L1 and L2 deflected by the polygon mirror 16 is allowed to be continuously incident onto the light receiving sensor 32. In other words, each of the BD signals BD1 and BD2 is output from the light receiving sensor 32 within the longest light-incident time period Tmax. As shown in FIG. 6, the single cycle TS of the first pattern is shorter than the longest light-incident time period Tmax.

It is noted that the first pattern is not limited to such a waveform pattern that the first time period T1 and the second time period T2 are alternately repeated. For example, the first pattern may be such a waveform pattern that the first time period T1, the second time period T2, a third time period, and a fourth time period are alternately repeated in a predetermined cycle. Here, the third time period and the fourth time period are different from the first time period T1 and the second time period T2. In this case, during the third time period, the first BD signal BD1 may have a voltage value of the first level LV1. Further, during the fourth time period, the first BD signal BD1 may have a voltage value of the second level LV2. Alternatively, the first BD signal BD1 may have different voltage values in the first time period T1, the second time period T2, the third time period, and the fourth time period, respectively.

Further, as shown in FIG. 6, a second light emission signal LD2 for emitting the second laser beam L2 has a second pattern, different from the first pattern, which is such a waveform pattern as to have a time period during which the second BD signal BD2 has a voltage value of a third level LV3 higher than the second level LV2, in the BD period K2. It is noted that the third level LV3 of the second BD signal BD2 may be as high as the first level LV1, or may be different from the first level LV1. In other words, the maximum value of the first light emission signal LD1 may be the same as or different from the maximum value of the second light emission signal LD2.

Namely, in the illustrative embodiment, the light emission control circuit 38 is configured to control the twin-beam laser emitter 15 to emit the first laser beam L1 in accordance with the first pattern (of the first light emission signal LD1) repeating the cycle TS (a first light emission process). Here, the cycle TS includes the first time period T1 during which the first BD signal BD1 has a voltage value of the first level LV1, and the second time period T2 during which the first BD signal BD1 has a voltage value of the second level LV2 lower than the first level LV1. Further, the cycle TS is shorter than the longest light-incident time period Tmax that is a longest time period during which the first laser beam L1 deflected by the polygon mirror 16 is allowed to be continuously incident onto the light receiving sensor 32.

Further, the light emission control circuit 38 is configured to control the twin-beam laser emitter 15 to emit the second laser beam L2 in accordance with the second pattern (of the second light emission signal LD2) having the time period during which the second BD signal BD2 has a voltage value of a third level LV3 higher than the second level LV2 (a second light emission process).

In the illustrative embodiment, the light emission control circuit 38 halts emission of the first laser beam L1 during the second time period T2 of the first pattern in the first light emission process. Therefore, as shown in FIG. 6, in the second time period T2, the second level LV2 is zero volts. Thereby, it is possible to make it easy to take light emission control of the twin-beam laser emitter 15. In this respect, however, the second level LV2 in the second time period T2 is not limited to zero volts, but may be any voltage level lower than the first level LV1.

Further, in the illustrative embodiment, during the BD period K2, the light emission control circuit 38 controls the twin-beam laser emitter 15 to emit the second laser beam L2 in accordance with the second pattern in which the second BD signal BD2 has only a voltage value of the third level during the BD period K2. In other words, as shown in FIG. 6, the second light emission signal LD2 for emitting the second laser beam L2 is a signal having a constant voltage level (a direct current pattern) during the BD period K2. Namely, the second laser beam L2 is emitted according to the pattern for continuous light emission with a predetermined light intensity. Therefore, it is possible to make the second light emission process simple, and achieve the light emission pattern (the second pattern) for the second laser beam L2 different from the light emission pattern (the first pattern) for the first laser beam L1. Thus, it is possible to shorten a time period required for the below-mentioned sensor signal identifying process.

It is noted that the second light emission signal LD2 during the BD period K2 is not limited to a signal having only a constant voltage level of the third level. For instance, the second pattern may be such a pulse pattern that the third level and the second level are repeated at a cycle different from the cycle TS of the first pattern during the BD period K2. The second light emission signal LD2 during the BD period K2 may be a signal according to any pattern (e.g., the second pattern) that is different from the first pattern for the first light emission signal LD1 during the BD period K2, and makes it possible to identify which one of the laser sources, each of the BD signals (BD1 and BD2) has been output responsive to the laser bean emitted by, during the BD period K2.

As shown in FIG. 5, the BD processing circuit 40 includes an amplifier circuit 41, a first comparator 42, and a second comparator 43. The amplifier circuit 41 is configured to amplify the BD signals BD1 and BD2 to predetermined levels, and supply the amplified BD signals BD1 and BD2 to non-inverting input terminals of the first comparator 42 and the second comparator 43.

An inverting input terminal of the first comparator 42 is supplied with a first reference voltage REF1. An inverting input terminal of the second comparator 43 is supplied with a second reference voltage REF2.

As shown in FIG. 7, the first reference voltage REF1 is higher than the second level LV2 of the first BD signal BD1, and lower than the first level LV1 of the first BD signal BD1 and the third level LV3 of the second BD signal BD2. Further, the second reference voltage REF2 is lower than a summation of the first level LV1 of the first BD signal BD1 and the third level LV3 of the second BD signal BD2.

The first comparator 42 is configured to output a first comparison signal CP1 generated based on comparison between the first reference voltage REF1 and the BD signals BD1 and BD2 that have been output from the light receiving sensor 32 and amplified by the amplifier circuit 41. Further, the second comparator 43 is configured to output a second comparison signal CP2 generated based on comparison between the second reference voltage REF2 and the BD signals BD1 and BD2 that have been output from the light receiving sensor 32 and amplified by the amplifier circuit 41.

4. Sensor Signal Identifying Process

Subsequently, referring to FIGS. 6 to 10, a sensor signal identifying process to be executed by the light emission control circuit 38 will be described. In the sensor signal identifying process, the light emission control circuit 38 identifies whether the BD signal output from the light receiving sensor 32 is a signal according to the first pattern or a signal according to the second pattern, i.e., whether the BD signal output from the light receiving sensor 32 is the first BD signal BD1 or the second BD signal BD2, based on the first comparison signal CP1 and the second comparison signal CP2. Hereinafter, explanations will be provided about identification examples depending on a time difference between the laser beams L1 and L2 incident onto the light receiving sensor 32, i.e., a time difference between the first BD signal BD1 and the second BD signal BD2.

4-1. When an Incident Period of the Second Laser Beam L2 Entirely Precedes an Incident Period of the First Laser Beam L1

When an incident period during which the second laser beam L2 is incident onto the light receiving sensor 32 entirely precedes an incident period during which the first laser beam L1 is incident onto the light receiving sensor 32 without any overlap therebetween, as shown in FIG. 6, an output period during which the second BD signal BD2 is output from the light receiving sensor 32 entirely precedes an output period during which the first BD signal BD1 is output from the light receiving sensor 32 without any overlap therebetween. In this case, the first comparison signal CP1 only changes, and the second comparison signal CP2 does not show any change. Therefore, based on changes in the first comparison signal CP1, it is possible for the light emission control circuit 38 to identify a rise-up time at which the level of the first BD signal BD1 rises up and a rise-up time at which the level of the second BD signal BD2 rises up.

Specifically, when the first comparison signal CP1 does not show any change in its level during the cycle TS from a rise-up time t1 at which the level of the first comparison signal CP1 rises up, it is possible for the light emission control circuit 38 to identify the rise-up time t1 as a rise-up time at which the level of the second BD signal BD2 rises up. Further, the light emission control circuit 38 confirms that a high-level period of the first comparison signal CP1 continues until a time t2 as an end time of the longest light-incident time period Tmax, and that there is not a rise in the level of the second comparison signal CP2 during the longest light-incident time period Tmax. Then, when the level of the first comparison signal CP1 rises up again at a time t3 after the time t2 and changes during the cycle TS of the first light emission signal LD1, it is possible to for the light emission control circuit 38 identify the time t3 as a rise-up time at which the level of the first BD signal BD1 rises up.

Then, the light emission control circuit 38 determines a moment (timing) to start writing the scanning line M2 by the second laser beam L2 on the basis of the time t1 (see FIG. 6). Further, the light emission control circuit 38 determines a moment (timing) to start writing the scanning line M1 by the first laser beam L1 on the basis of the time t3 (see FIG. 6).

Thus, in the illustrative embodiment, the light emission control circuit 38 determines whether a BD signal BD1 or BD2 is a signal output in accordance with the first pattern or the second pattern, by detecting the respective rise-up times of the first comparison signal CP1 and the second comparison signal CP2, i.e., by detecting rising edges of the BD signals. Therefore, in the illustrative embodiment, it is possible to effectively perform the sensor signal identifying process based on the change in the level of each comparison signal CP1 and CP2 from the low level to the high level. It is noted that the input signals input into each comparator 42 and 43 may be reversed. In this case, the sensor signal identifying process may be performed based on a change in a level of each comparison signal CP1 and CP2 from a high level to a low level.

4-2. When the Incident Period of the Second Laser Beam L2 Precedes and Partially Overlaps the Incident Period of the First Laser Beam L1 with a Partial Overlap Therebetween Subsequently, referring to FIG. 7, an explanation will be provided about when the incident period during which the second laser beam L2 is incident onto the light receiving sensor 32 precedes and partially overlaps the incident period during which the first laser beam L1 is incident onto the light receiving sensor 32. When the incident period of the first laser beam L1 and the incident period of the second laser beam L2 partially overlap each other, the output period of the first BD signal BD1 and the output period of the second BD signal BD2 partially overlap each other. In this case, as shown in FIG. 7, the second comparison signal CP2 is at the high level during a time period that substantially corresponds to an overlap between the output period of the first BD signal BD1 and the output period of the second BD signal BD2. Therefore, when confirming that the first comparison signal CP1 does not show any change in its level during the cycle TS of the first light emission signal LD1 from a time t4 at which the first comparison signal CP1 rises up, and detecting a rise in the level of the second comparison signal CP2 at a time t5, the light emission control circuit 38 is allowed to identify the time t4 (see FIG. 7) as a rise-up time at which the level of the second BD signal BD2 rises up. Further, the light emission control circuit 38 is allowed to identify the time t5 at which the level of the second comparison signal CP2 rises up, as a rise-up time at which the level of the first BD signal BD1 rises up.

Then, the light emission control circuit 38 determines a moment (timing) to start writing the scanning line M2 by the second laser beam L2, on the basis of the time t4 (see FIG. 7). Further, the light emission control circuit 38 determines a moment (timing) to start writing the scanning line M1 by the laser beam L1, on the basis of the time t5 (see FIG. 7).

4-3. When the Incident Period of the First Laser Beam L1 and the Incident Period of the Second Laser Beam L2 Entirely Overlap Each Other Next, referring to FIG. 8, an explanation will be provided about when the incident period of the first laser beam L1 and the incident period of the second laser beam L2 entirely overlap each other. When the incident period of the first laser beam L1 and the incident period of the second laser beam L2 entirely overlap each other, as shown in FIG. 8, the output period of the first BD signal BD1 and the output period of the second BD signal BD2 overlap each other during the longest light-incident time period Tmax. In this case, during the longest light-incident time period Tmax, the first comparison signal CP1 corresponds to the second BD signal BD2, and the second comparison signal CP2 corresponds to the first BD signal BD1.

Therefore, for instance, when confirming that the first comparison signal CP1 does not show any change in its level during the cycle TS of the first light emission signal LD1 from a time t6 at which the level of the first comparison signal CP1 rises up, and detecting a rise in the level of the second comparison signal CP2 at a time t7, the light emission control circuit 38 is allowed to identify the time t6 as a rise-up time at which the level of the second BD signal BD2 rises up. Further, the light emission control circuit 38 is allowed to identify the time t7 as a rise-up time at which the level of the first BD signal BD1 rises up.

Then, the light emission control circuit 38 determines a moment (timing) to start writing the scanning line M2 by the second laser beam L2, on the basis of the time t6 (see FIG. 8). Further, the light emission control circuit 38 determines a moment (timing) to start writing the scanning line M1 by the first laser beam L1, on the basis of the time t7 (see FIG. 8).

4-4. When the Incident Period of the First Laser Beam L1 Precedes and Partially Overlaps the Incident Period of the Second Laser Beam L2

Next, referring FIG. 9, an explanation will be provided about when the incident period of the first laser beam L1 precedes and partially overlaps the incident period of the second laser beam L2. In this case, when detecting a rise in the level of the first comparison signal CP1 at a time t8 (see FIG. 9) and a change in the level of the first comparison signal CP1 within the cycle TS from the time t8, the light emission control circuit 38 is allowed to identify the time t8 (see FIG. 9) as a rise-up time at which the level of the first BD signal BD1 rises up.

Further, when detecting a rise in the level of the second comparison signal CP2 at a time t10, the light emission control circuit 38 is allowed to determine that the level of the second BD signal BD2 has risen up within the second time period T2 from the time t10. In other words, the light emission control circuit 38 is allowed to identify the time t10 as being substantially coincident with a rise-up time t9 of the second BD signal BD2.

Then, the light emission control circuit 38 determines a moment (timing) to start writing the scanning line M1 by the first laser beam L1, on the basis of the time t8 (see FIG. 9). Further, the light emission control circuit 38 determines a moment (timing) to start writing the scanning line M2 by the second laser beam L2, on the basis of the time t10 (see FIG. 9).

Preferably, the second time period T2 may be set to be shorter than the first time period T1. In this case, it is possible to shorten a low-level time period corresponding to the second time period T2 of the first pattern, when the light emission control circuit 38 detects a rising edge of the first comparison signal CP1 and a rising edge of the second comparison signal CP2. Therefore, it is possible to reduce a timing error in detecting the second pattern, i.e., detecting the second laser beam L2 as an identified laser beam. Thus, in FIG. 9, it is possible to reduce an error time period K4 (see FIG. 9) between the actual rise-up time t9 of the second BD signal BD2 and the rise-up time t10 of the second comparison signal CP2.

4-5. When the Incident Period of the First Laser Beam L1 Entirely Precedes the Incident Period of the Second Laser Beam L2

Finally, referring to FIG. 10, an explanation will be provided about when the incident period of the first laser beam L1 entirely precedes the incident period of the second laser beam L2. In this case, when detecting a rise in the level of the first comparison signal CP1 at a time t11 (see FIG. 10) and a change in the level of the first comparison signal CP1 within the cycle TS from the time t11, the light emission control circuit 38 is allowed to identify the time t11 (see FIG. 10) as a rise-up time at which the level of the first BD signal BD1 rises up.

Further, when not detecting a rise in the level of the second comparison signal CP2 within a time period from the time t11 to a time t12 as an end time of the longest light-incident time period Tmax, and detecting a rise in the level of the first comparison signal CP1 at a time t13 after the time t12, the light emission control circuit 38 is allowed to identify the time t13 as a rise-up time at which the level of the second BD signal BD2 rises up.

Then, the light emission control circuit 38 determines a moment (timing) to start writing the scanning line M1 by the first laser beam L1, on the basis of the time t11 (see FIG. 10). Further, the light emission control circuit 38 determines a moment (timing) to start writing the scanning line M2 by the second laser beam L2, on the basis of the time t13 (see FIG. 10).

Thus, in the illustrative embodiment, basically, the light emission control circuit 38 identifies whether a BD signal (BD1 or BD2) output from the light receiving sensor 32 is the signal (LD1) according to the first pattern or the signal (LD2) according to the second pattern. At this time, based on the first comparison signal CP1 and the second comparison signal CP2, the light emission control circuit 38 identifies whether a BD signal (BD1 or BD2) output from the light receiving sensor 32 is the signal (LD1) according to the first pattern or the signal (LD2) according to the second pattern.

Therefore, when the incident period during which the first laser beam L1 is incident onto the light receiving sensor 32 does not overlap the incident period during which the second laser beam L2 is incident onto the light receiving sensor 32, the light emission control circuit 38 is allowed to discriminate between the first BD signal BD1 output from the light receiving sensor 32 in accordance with the first pattern and the second BD signal BD2 output from the light receiving sensor 32 in accordance with the second pattern, based on the first comparison signal CP1. Meanwhile, when the incident period of the first laser beam L1 overlaps the incident period of the second laser beam L2, the light emission control circuit 38 is allowed to accurately discriminate between the first BD signal BD1 according to the first pattern and the second BD signal BD2 according to the second pattern, based on the first comparison signal CP1 and the second comparison signal CP2.

Further, as described above, the light emission control circuit 38 determines a moment (timing) to start emitting a laser beam, of the laser beams L1 and L2, which is identified as a laser beam emitted according to the identified pattern, onto the object (the photoconductive body 10) to be scanned, based on the moments (e.g., the times t1, t3, t4, t5, t6, t7, t8, t10, t11, and t13) at which the light receiving sensor 32 detects the identified laser beam. It is noted that the first comparator 42 and the second comparator 43 may be omitted. In this case, the light emission control circuit 38 may be configured to detect rises in the levels of the first BD signal BD1 and the second BD signal BD2 within the BD period K2, simply based on the waveform of the BD signals (BD1 and BD2).

5. Advantageous Effects of Illustrative Embodiment

In the illustrative embodiment, as described above, in the BD period K2 for determining the moment to start writing the scanning line M1 by the first laser beam L1 emitted by the twin-beam laser emitter 15 and the moment to start writing the scanning line M2 by the second laser beam L2 emitted by the twin-beam laser emitter 15, the first pattern as a signal pattern of the first light emission signal LD1 and the second pattern as a signal pattern of the second light emission signal LD2 are formed different from each other. Thus, when the patterns of the laser driving signals (i.e., the light emission signals LD1 and LD2) are differentiated from each other, the BD signals BD1 and BD2 are output from the light receiving sensor 32 in respective different patterns depending on conditions for the light receiving sensor 32 to receive the laser beams L1 and L2. Based on the differences in the BD signals BD1 and BD2 (see FIGS. 6 to 10), it is possible to accurately grasp a correlation between the BD signals BD1 and BD2 and the laser beams L1 and L2 (i.e., to accurately identify which one of the laser sources, the light receiving sensor 32 has issued each individual BD signal (BD1 and BD2) in response to receipt of a laser beam emitted by) even in a situation where a sequence of the laser beams L1 and L2 incident onto the light receiving sensor 32 is reversed. At that time, using the first comparison signal CP1 and the second comparison signal CP2, it is possible to accurately discriminate between the first BD signal BD1 output from the light receiving sensor 32 in accordance with the first pattern and the second BD signal BD2 output from the light receiving sensor 32 in accordance with the second pattern.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

<Modification>

In the aforementioned illustrative embodiment, aspects of the present disclosure are applied to the scanning section 12 for exposing the photoconductive body 10 in the laser printer 1. Nevertheless, aspects of the present disclosure may be applied to any other electrical or electronic devices required to accurately identify which one of laser sources, a BD sensor has output each individual BD signal in response to receipt of a laser beam emitted by, even in a situation where a sequence of a plurality of laser beams incident onto the BD sensor is reversed.

What is claimed is:

1. An optical scanning device comprising:
   a light emitter configured to emit a first light beam and a second light beam;
   a motor;
   a polygon mirror configured to, when driven to rotate by the motor, periodically deflect the first light beam and the second light beam emitted by the light emitter, and form, on an object to be scanned, a first scanning line by the first light beam and a second scanning line by the second light beam;
   a sensor configured to output a first signal in response to detection of the first light beam deflected by the polygon mirror, and output a second signal in response to detection of the second light beam deflected by the polygon mirror; and
   a controller configured to:
      control the light emitter to emit the first light beam in accordance with a first pattern, the first pattern being such a waveform pattern as to repeat a cycle that includes a first time period during which the first signal output from the sensor has a voltage value of a first level, and a second time period during which the first signal output from the sensor has a voltage value of a second level lower than the first level, the cycle being shorter than a longest light-incident time period that is a longest time period during which the first light beam deflected by the polygon mirror is allowed to be continuously incident onto the sensor;
      control the light emitter to emit the second light beam in accordance with a second pattern that is different from the first pattern, the second pattern including a third time period during which the second signal output from the sensor has a voltage value of a third level higher than the second level;
      discriminate between the first signal output from the sensor in accordance with the first pattern and the second signal output from the sensor in accordance with the second pattern;
      identify a first moment at which the sensor has output the discriminated first signal according to the first pattern, and a second moment at which the sensor has output the discriminated second signal according to the second pattern; and
      determine a moment to start forming, on the object, the first scanning line by the first light beam, based on the identified first moment, and determine a moment to start forming, on the object, the second scanning line by the second light beam, based on the identified second moment.

2. The optical scanning device according to claim 1, wherein the controller is configured to control the light emitter to emit the second light beam in accordance with the second pattern consisting of the third time period during which the signal output from the sensor has the voltage value of the third level.

3. The optical scanning device according to claim 1, further comprising:
   a first comparator configured to compare the signal output from the sensor with a first reference voltage that is higher than the second level and lower than the first level and the third level, and output a first comparison signal; and a second comparator configured to compare the signal output from the sensor with a second reference voltage that is lower than a summation of the first level and the third level, and output a second comparison signal, wherein the controller is configured to discriminate between the first signal output from the sensor in accordance with the first pattern and the second signal output from the sensor in accordance with the second pattern, based on the first comparison signal and the second comparison signal.

4. The optical scanning device according to claim 3, wherein the controller is configured to:

detect a rising edge of the first comparison signal and a rising edge of the second comparison signal; and identify the first moment at which the sensor has output the discriminated first signal according to the first pattern and the second moment at which the sensor has output the discriminated second signal according to the second pattern, based on the detected rising edge of the first comparison signal and the detected rising edge of the second comparison signal.

5. The optical scanning device according to claim 1, wherein, in the first pattern, the second time period is set to be shorter than the first time period.

6. The optical scanning device according to claim 1, wherein the controller is configured to control the light emitter to halt emission of the first light beam during the second time period of the first pattern.

7. An image forming apparatus comprising:
a photoconductive body; and
an optical scanning device comprising:
a light emitter configured to emit a first light beam and a second light beam;
a motor;
a polygon mirror configured to, when driven to rotate by the motor, periodically deflect the first light beam and the second light beam emitted by the light emitter, and form, on an object to be scanned, a first scanning line by the first light beam and a second scanning line by the second light beam;
a sensor configured to output a first signal in response to detection of the first light beam deflected by the polygon mirror, and output a second signal in response to detection of the second light beam deflected by the polygon mirror; and
a controller configured to:
control the light emitter to emit the first light beam in accordance with a first pattern, the first pattern being such a waveform pattern as to repeat a cycle that includes a first time period during which the first signal output from the sensor has a voltage value of a first level, and a second time period during which the first signal output from the sensor has a voltage value of a second level lower than the first level, the cycle being shorter than a longest light-incident time period that is a longest time period during which the first light beam deflected by the polygon mirror is allowed to be continuously incident onto the sensor;
control the light emitter to emit the second light beam in accordance with a second pattern that is different from the first pattern, the second pattern including a third time period during which the second signal output from the sensor has a voltage value of a third level higher than the second level;

discriminate between the first signal output from the sensor in accordance with the first pattern and the second signal output from the sensor in accordance with the second pattern;

identify a first moment at which the sensor has output the discriminated first signal according to the first pattern, and a second moment at which the sensor has output the discriminated second signal according to the second pattern; and determine a moment to start forming, on the object, the first scanning line by the first light beam, based on the identified first moment, and determine a moment to start forming, on the object, the second scanning line by the second light beam, based on the identified second moment.

8. The image forming apparatus according to claim 7, wherein the controller is configured to control the light emitter to emit the second light beam in accordance with the second pattern consisting of the third time period during which the signal output from the sensor has the voltage value of the third level.

9. The image forming apparatus according to claim 7, wherein the optical scanning device further comprises:
a first comparator configured to compare the signal output from the sensor with a first reference voltage that is higher than the second level and lower than the first level and the third level, and output a first comparison signal; and a second comparator configured to compare the signal output from the sensor with a second reference voltage that is lower than a summation of the first level and the third level, and output a second comparison signal, and wherein the controller is configured to discriminate between the first signal output from the sensor in accordance with the first pattern and the second signal output from the sensor in accordance with the second pattern, based on the first comparison signal and the second comparison signal.

10. The image forming apparatus according to claim 9, wherein the controller is configured to:

detect a rising edge of the first comparison signal and a rising edge of the second comparison signal; and identify the first moment at which the sensor has output the discriminated first signal according to the first pattern and the second moment at which the sensor has output the discriminated second signal according to the second pattern, based on the detected rising edge of the first comparison signal and the detected rising edge of the second comparison signal.

11. The image forming apparatus according to claim 7, wherein, in the first pattern, the second time period is set to be shorter than the first time period.

12. The image forming apparatus according to claim 7, wherein the controller is configured to control the light emitter to halt emission of the first light beam during the second time period of the first pattern.

13. A method adapted to be implemented on a control device coupled with an optical scanning device comprising:
a light emitter configured to emit a first light beam and a second light beam;
a motor;
a polygon mirror configured to, when driven to rotate by the motor, periodically deflect the first light beam and the second light beam emitted by the light emitter, and form, on an object to be scanned, a first scanning line by the first light beam and a second scanning line by the second light beam;

a sensor configured to output a first signal in response to detection of the first light beam deflected by the polygon mirror, and output a second signal in response to detection of the second light beam deflected by the polygon mirror, the method comprising:

controlling the light emitter to emit the first light beam in accordance with a first pattern, the first pattern being such a waveform pattern as to repeat a cycle that includes a first time period during which the first signal output from the sensor has a voltage value of a first level, and a second time period during which the first signal output from the sensor has a voltage value of a second level lower than the first level, the cycle being shorter than a longest light-incident time period that is a longest time period during which the first light beam deflected by the polygon mirror is allowed to be continuously incident onto the sensor;

controlling the light emitter to emit the second light beam in accordance with a second pattern that is different from the first pattern, the second pattern including a third time period during which the second signal output from the sensor has a voltage value of a third level higher than the second level;

discriminating between the first signal output from the sensor in accordance with the first pattern and the second signal output from the sensor in accordance with the second pattern;

identifying a first moment at which the sensor has output the discriminated first signal according to the first pattern, and a second moment at which the sensor has output the discriminated second signal according to the second pattern; and determining a moment to start forming, on the object, the first scanning line by the first light beam, based on the identified first moment, and determining a moment to start forming, on the object, the second scanning line by the second light beam, based on the identified second moment.

14. The method according to claim 13, wherein the second pattern consists of the third time period during which the signal output from the sensor has the voltage value of the third level.

15. The method according to claim 13, wherein the optical scanning device further comprises:

a first comparator configured to compare the signal output from the sensor with a first reference voltage that is higher than the second level and lower than the first level and the third level, and output a first comparison signal; and a second comparator configured to compare the signal output from the sensor with a second reference voltage that is lower than a summation of the first level and the third level, and output a second comparison signal, and wherein the discriminating is performed based on the first comparison signal and the second comparison signal.

16. The method according to claim 15, further comprising detecting a rising edge of the first comparison signal and a rising edge of the second comparison signal, wherein the identifying is performed based on the detected rising edge of the first comparison signal and the detected rising edge of the second comparison signal.

17. The method according to claim 13, wherein, in the first pattern, the second time period is set to be shorter than the first time period.

18. The method according to claim 13, wherein, during the second time period of the first pattern, the light emitter is controlled to halt emission of the first light beam.

* * * * *